US012422102B1

(12) United States Patent
Yeggy

(10) Patent No.: US 12,422,102 B1
(45) Date of Patent: Sep. 23, 2025

(54) BOSS WITH INVERTED NECK

(71) Applicant: HEXAGON TECHNOLOGY AS, Alesund (NO)

(72) Inventor: Brian C. Yeggy, Lincoln, NE (US)

(73) Assignee: HEXAGON TECHNOLOGY AS, Alesund (NO)

( * ) Notice: Subject to any disclaimer, the term of this patent is extended or adjusted under 35 U.S.C. 154(b) by 303 days.

(21) Appl. No.: 17/710,222

(22) Filed: Mar. 31, 2022

Related U.S. Application Data

(60) Provisional application No. 63/184,435, filed on May 5, 2021.

(51) Int. Cl.
*F17C 13/04* (2006.01)
*F17C 1/00* (2006.01)

(52) U.S. Cl.
CPC ................ *F17C 13/04* (2013.01); *F17C 1/00* (2013.01); *F17C 2203/0604* (2013.01); *F17C 2205/0305* (2013.01); *F17C 2205/0323* (2013.01)

(58) Field of Classification Search
CPC .... F17C 2205/0305; F17C 1/00; F17C 13/04; F17C 2203/0604; F17C 2205/0323; F17C 13/06; F17C 2205/03; F17C 2205/0302; F17C 2205/74; F17C 2205/0388
USPC .......................................................... 220/586
See application file for complete search history.

(56) References Cited

U.S. PATENT DOCUMENTS 4,838,971 A 6/1989 Cacak
4,865,210 A * 9/1989 Brainard II ............... B63B 3/13 220/586
5,429,845 A 7/1995 Newhouse et al.
5,476,189 A 12/1995 Duvall et al.
7,556,171 B2 * 7/2009 Ishimaru ................... F17C 1/16 220/601
8,732,929 B2 5/2014 Inagi
9,683,700 B2 6/2017 Coors et al.
2012/0023731 A1 * 2/2012 Inagi ..................... B29C 53/602 29/428
2012/0205337 A1 * 8/2012 Holbach ................. F17C 13/06 215/40
2014/0103051 A1 * 4/2014 Kanezaki ............. F17C 13/002 220/587
2015/0001229 A1 1/2015 Helmig et al.
2015/0330568 A1 11/2015 Nettis et al.
2018/0142839 A1 5/2018 Taguchi et al.
2018/0202554 A1 * 7/2018 Hogan .................... F17C 13/06
(Continued)

FOREIGN PATENT DOCUMENTS

CN 208090298 U 11/2018
JP 6409531 B2 10/2018
WO WO-2015197457 A1 * 12/2015 .............. F17C 13/06

*Primary Examiner* — Don M Anderson
*Assistant Examiner* — Laura E. Parker
(74) *Attorney, Agent, or Firm* — Mai D. Lauer; Westman, Champlin & Koehler P.A.

(57) ABSTRACT

A pressure vessel includes a composite wall and a boss. The composite wall includes an outer shell, an inner liner disposed within the outer shell, and a port in the wall through which fluid may be communicated between an exterior of the pressure vessel and an interior of the pressure vessel. The boss is disposed at the port. The boss includes a neck projecting interiorly into the pressure vessel and a flange extending radially outward from the neck. The liner contacts the flange and does not contact at least an interiorly extending portion of the neck.

17 Claims, 8 Drawing Sheets

(56) References Cited

U.S. PATENT DOCUMENTS

| | | | | |
|---|---|---|---|---|
| 2018/0209587 | A1* | 7/2018 | Helmig | F17C 1/16 |
| 2019/0049068 | A1* | 2/2019 | Sawai | B32B 15/14 |
| 2020/0309321 | A1* | 10/2020 | Ueda | B29C 70/70 |

* cited by examiner

BOSS WITH INVERTED NECK

CROSS REFERENCE TO RELATED APPLICATIONS

This application claims the benefit of priority from U.S. Provisional Patent Application No. 63/184,435, filed May 5, 2021, which is hereby incorporated by reference in its entirety.

BACKGROUND

Pressure vessels are commonly used for containing a variety of fluids under pressure, such as hydrogen, oxygen, natural gas, nitrogen, propane, methane and other fuels, for example. Generally, pressure vessels can be of any size or configuration. The vessels can be heavy or light, single-use (e.g., disposable), reusable, subjected to high pressures (greater than 50 pounds per square inch (psi) or 344,738 pascal, for example) or low pressures (less than 50 psi or 344,738 pascal, for example), or used for storing fluids at elevated or cryogenic temperatures, for example.

SUMMARY

A pressure vessel comprises a composite wall and a boss. The composite wall comprises an outer shell, an inner liner disposed within the outer shell, and a port in the wall through which fluid may be communicated between an exterior of the pressure vessel and an interior of the pressure vessel. The boss is disposed at the port. The boss comprises a neck projecting interiorly into the pressure vessel and a flange extending radially outward from the neck. The liner contacts the flange and does not contact at least an interiorly extending portion of the neck.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein similar or analogous structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope of the principles of this disclosure.

The figures may not be drawn to scale. In particular, some features may be enlarged relative to other features for clarity. Moreover, where terms such as interior, exterior, above, below, over, under, top, bottom, side, right, left, horizontal, vertical, etc., are used, it is to be understood that they are used only for ease of understanding the description. It is contemplated that structures may be oriented otherwise.

DETAILED DESCRIPTION

Suitable pressure vessel shell materials include metals, such as steel; or composites, which may include laminated layers of wound fiberglass filaments or other synthetic fibers bonded together by a thermal-setting or thermoplastic resin. The fiber may be fiberglass, aramid, carbon, graphite, or any other generally known fibrous reinforcing material. The resin material used may be epoxy, polyester, vinyl ester, thermoplastic, or any other suitable resinous material capable of providing fiber-to-fiber bonding, fiber layer-to-layer bonding, and the fragmentation resistance suitable for the particular application in which the vessel is to be used. The composite construction of a pressure vessel shell provides numerous advantages such as lightness in weight and resistance to corrosion, fatigue and catastrophic failure. These attributes are due to the high specific strengths of the reinforcing fibers or filaments. The shell resolves structural loads experienced by the pressure vessel.

A polymeric or other non-metallic resilient liner or bladder is often disposed within a composite shell to seal the vessel and prevent internal fluids from contacting the composite material. The liner can be manufactured by compression molding, blow molding, injection molding, or any other generally known technique. Alternatively, the liner can be made of other materials, including steel, aluminum, nickel, titanium, platinum, gold, silver, stainless steel, and any alloys thereof. Such materials can be generally characterized as having a high modulus of elasticity. In one embodiment, a liner is formed of blow molded high density polyethylene (HDPE).

Figure 1:
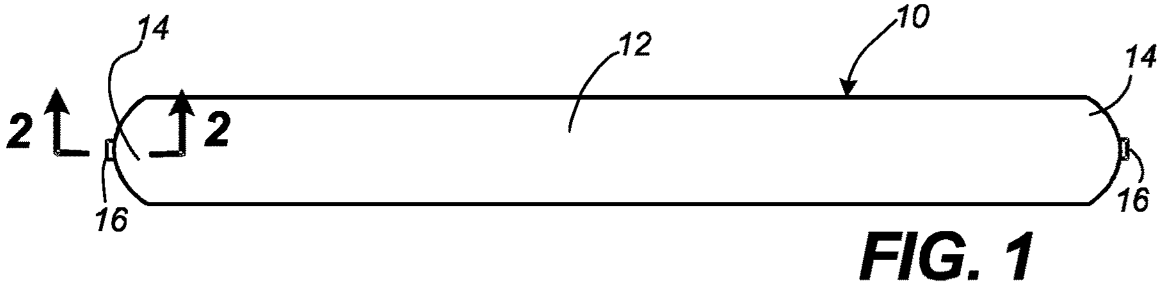
FIG. 1 (PRIOR ART)
FIG. 1 is a side view of a typical conventional pressure vessel.
Figure 2:
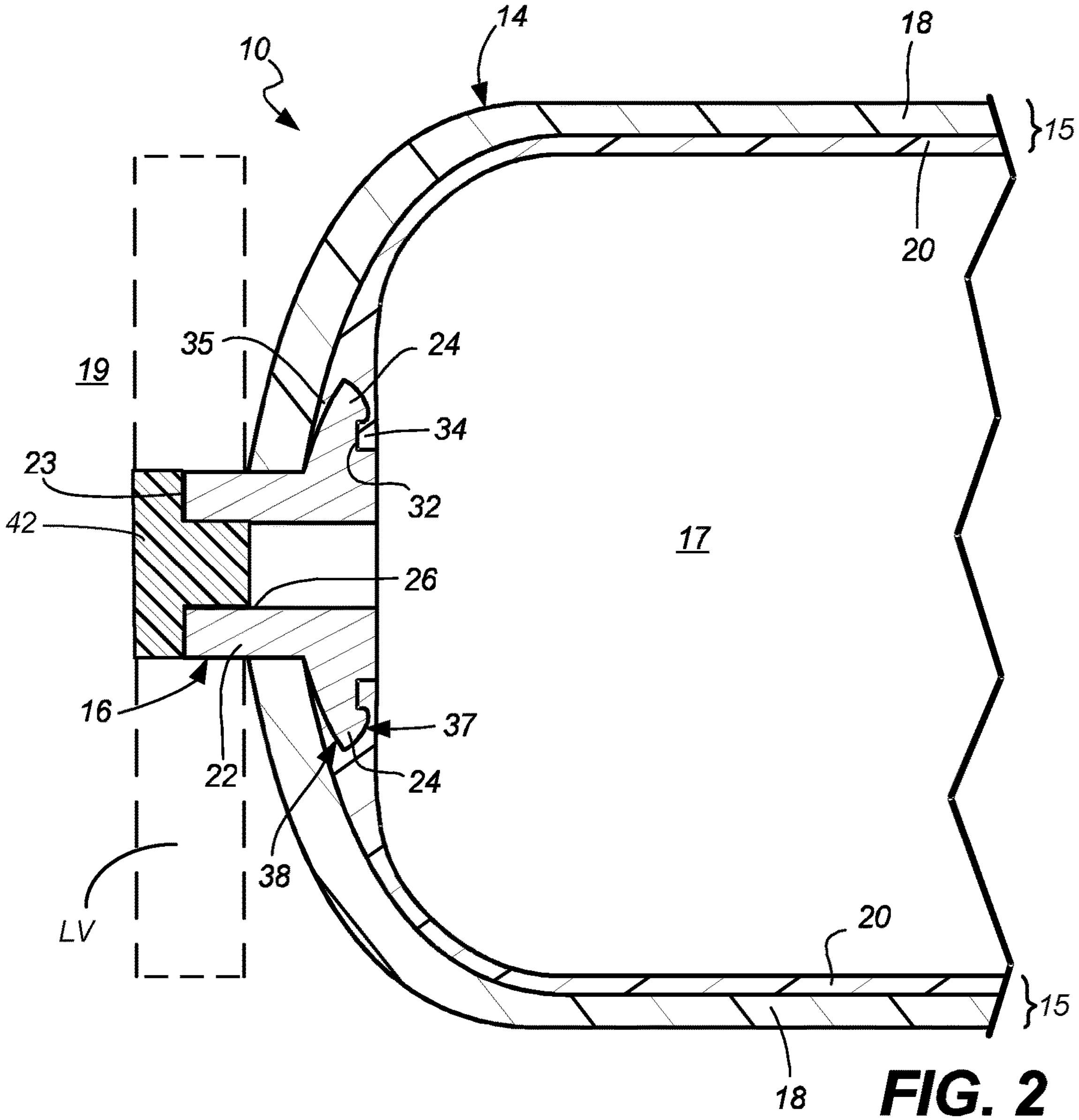
FIG. 2 (PRIOR ART)
FIG. 2 is a partial cross-sectional view of one end of the pressure vessel of FIG. 1, taken along line 2-2 of FIG. 1 and showing a typical boss, liner, shell and plug.

FIG. 1 illustrates an elongated pressure vessel 10, such as that disclosed in U.S. Pat. No. 5,476,189, entitled "Pressure vessel with damage mitigating system," which is hereby incorporated by reference. Pressure vessel 10 has a main body section 12 and substantially hemispherical or dome-shaped end sections 14. A boss 16, typically constructed of aluminum, is provided at one or both ends of the pressure vessel 10 to provide a port for communication between the interior environment 17 of the pressure vessel 10 and the exterior environment 19. As shown in FIG. 2, pressure vessel 10 has wall 15 formed with liner 20 (such as an inner polymer liner) covered by a shell 18. In an example, the shell 18 can be a filament-wound composite shell. The shell 18 resolves structural loads on the pressure vessel 10, while liner 20 provides a gas barrier.

FIG. 2 illustrates a partial cross-sectional view, taken along line 2-2 of FIG. 1, of an end section 14 including boss 16, such as that disclosed in U.S. Pat. No. 5,429,845, entitled "Boss for a filament wound pressure vessel," which is hereby incorporated by reference. Boss 16 includes neck 22 having exterior surface 23 and a port 26. The port 26 perpendicularly traverses the exterior surface 23 of the boss 16 and allows fluid communication between the exterior environment 19 and the interior environment 17 of pressure vessel 10. The boss 16 also includes a flange 24 (depicted as an annular flange) extending radially outward from port 26 relative to neck 22. In this disclosure, surfaces, directions, and elements facing interior environment 17 are referred to with the descriptor "interior," and surfaces, directions, and elements facing exterior environment 19 are referred to with the descriptor "exterior." It is to be understood that this notation is not limiting; rather, it is provided for convenience and ease of comprehension, and other descriptors may also be suitable.

Generally, flange 24 of boss 16 is contained between portions of liner 20 and/or is sandwiched between the liner 20 and the shell 18. Typically, shell 18 abuts neck 22. Flange 24 includes an exterior side 38 and an interior side 37. Flange 24 may include at least one groove 32 (depicted as an annular groove) that is shaped to accept a tab 34 (such as an annular tab) of liner 20. This construction mechanically secures the boss 16 to the pressure vessel 10.

A method of forming a pressure vessel 10 includes mounting a boss on a mandrel and allowing a fluid polymer material for liner 20 to flow around flange 24 and into groove 32 of boss 16. The liner material then solidifies, thereby forming, in some embodiments, a portion 35 of liner 20 adjacent to exterior side 38 of flange 24, and tab 34 received within groove 32. Liner 20 is thereby mechanically interlocked with boss 16. Accordingly, even under extreme pressure conditions, separation of liner 20 from boss 16 is prevented.

Typically, shell 18 is formed from wound fibers and surrounds the liner 20 and sometimes a portion of flange 24 of boss 16. In one method, a dispensing head for the fibers moves in such a way as to wrap the fiber on the liner 20 in a desired pattern. If the pressure vessel 10 is cylindrical, rather than spherical, fiber winding is normally applied in both a substantially longitudinal (helical) and circumferential (hoop) wrap pattern. This winding process is defined by a number of factors, such as resin content, fiber configuration, winding tension, and the pattern of the wrap in relation to the axis of the liner 20. Details relevant to the formation of an exemplary pressure vessel are disclosed in U.S. Pat. No. 4,838,971, entitled "Filament Winding Process and Apparatus," which is incorporated herein by reference.

A prior art boss 16 is shown in FIGS. 1 and 2. Boss 16 includes a neck 22 that extends entirely through the thickness of shell 18. As shown in FIG. 2, in use, plug 42, which includes or is connected to a valve, is inserted at least partially into port 26. To seal the connection between plug 42 and boss 16, a shoulder of the plug rests against the exterior surface 23 of boss 16. As illustrated, the plug 42 extends beyond the end 14 of pressure vessel 10, resulting in wasted overall pressure vessel length, so that the pressure vessel has a smaller volume than could otherwise be realized in that length of space (the lost potential internal vessel volume due to the extension of neck 22 and plug 42 exteriorly from the end section 14 is represented by the cylindrical "lost volume" segment LV shown in dashed lines in FIG. 2).

In some cases, analogous parts will be labeled with a single reference number and distinguished by a letter. For example, one known boss 16 and two embodiments of a disclosed boss 16*a*, 16*b* are described. In some respects, the structures sharing a number may be similar to each other. All descriptions of a part with a reference number also refer to other parts with that number and with or without a letter unless otherwise stated.

As shown in FIGS. 3-8, the described concept is for a boss 16*a*, 16*b* that does not have a neck that extends along the shell 18 of the pressure vessel 10. Thus, a pressure vessel 10*a*, 10*b* using boss 16*a*, 16*b* is able to utilize the entire length available to the vessel for gas containment. In exemplary embodiments of boss 16*a*, 16*b*, an interiorly projecting neck 22*a*, 22*b* is provided, thereby increasing the plate bending stiffness of flange 24 without extending along the shell 18. This is useful for very high-pressure applications. In the drawings of the boss 16*a*, 16*b* of the present disclosure, only half of the boss 16*a*, 16*b* is illustrated. It is to be understood that each boss 16*a*, 16*b* is a generally annular, symmetrical member. In exemplary embodiments, boss 16*a*, 16*b* are radially symmetrical about longitudinal axis 40.

Figure 3:
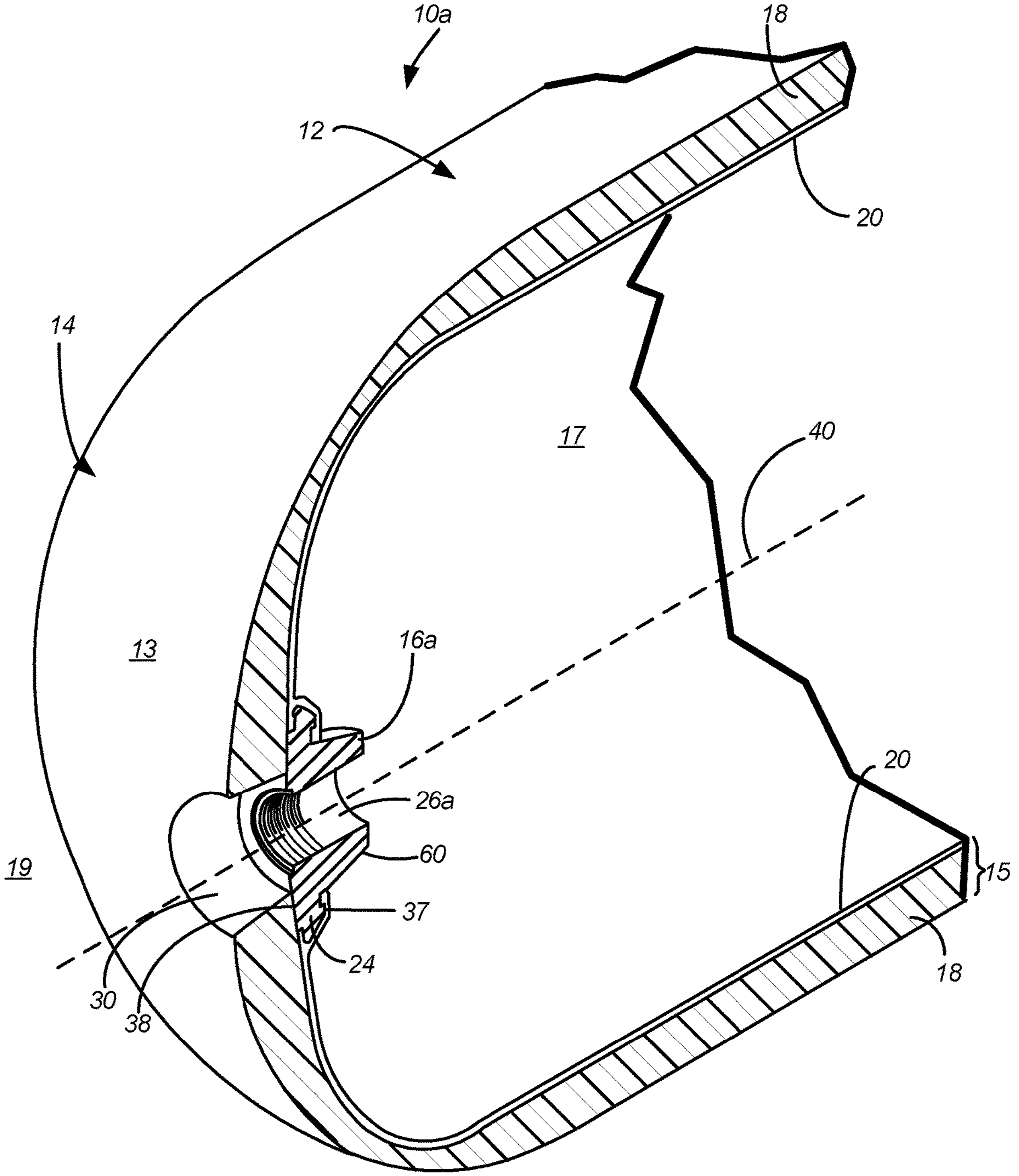
FIG. 3 is a cross-sectional partial perspective view of a pressure vessel with a first exemplary embodiment of a boss with an inverted neck, configured for a face sealing assembly with the pressure vessel plug shown in FIG. 5.
Figure 4:
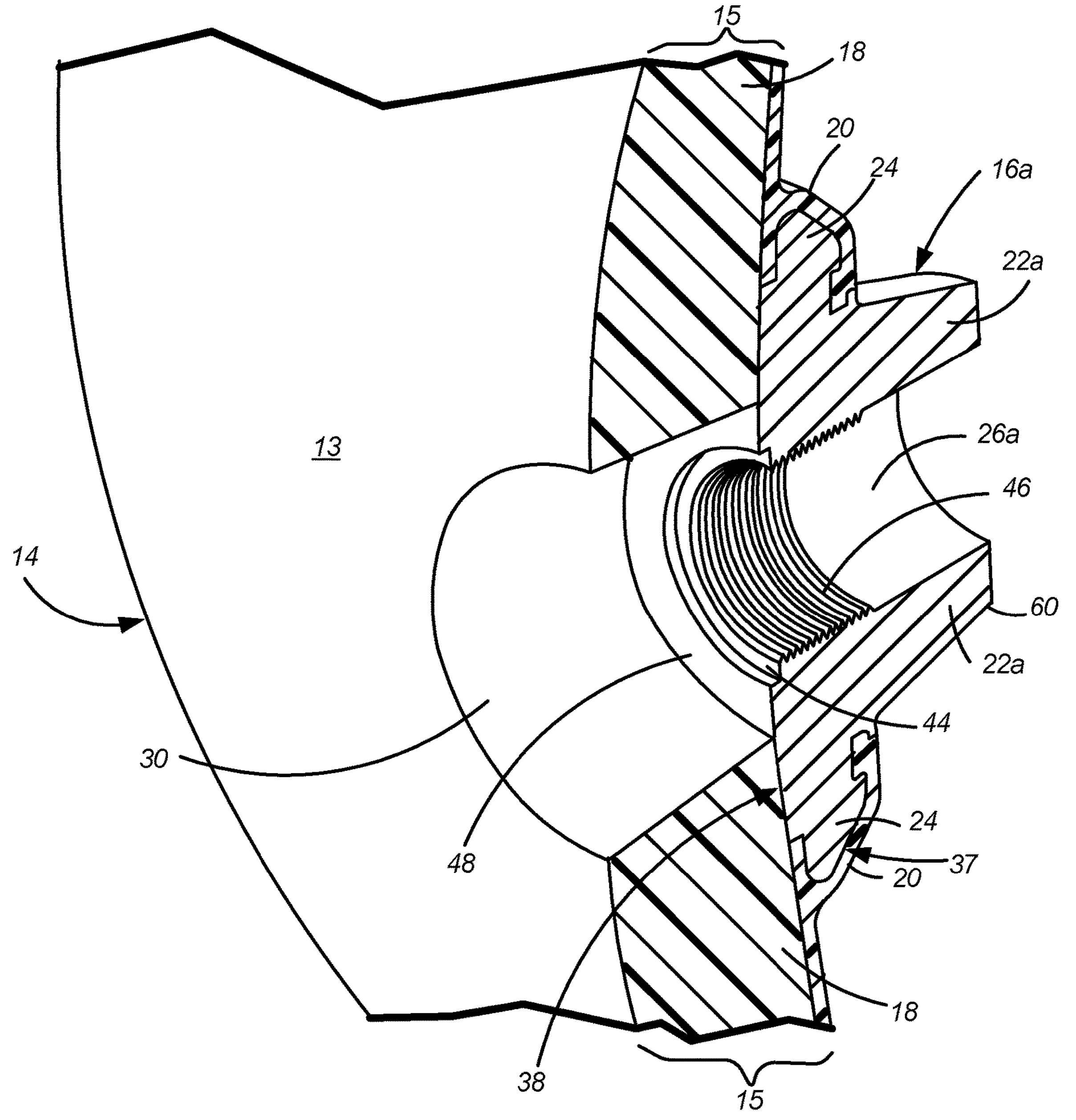
FIG. 4 is an enlarged view of a portion of FIG. 3.
Figure 5:
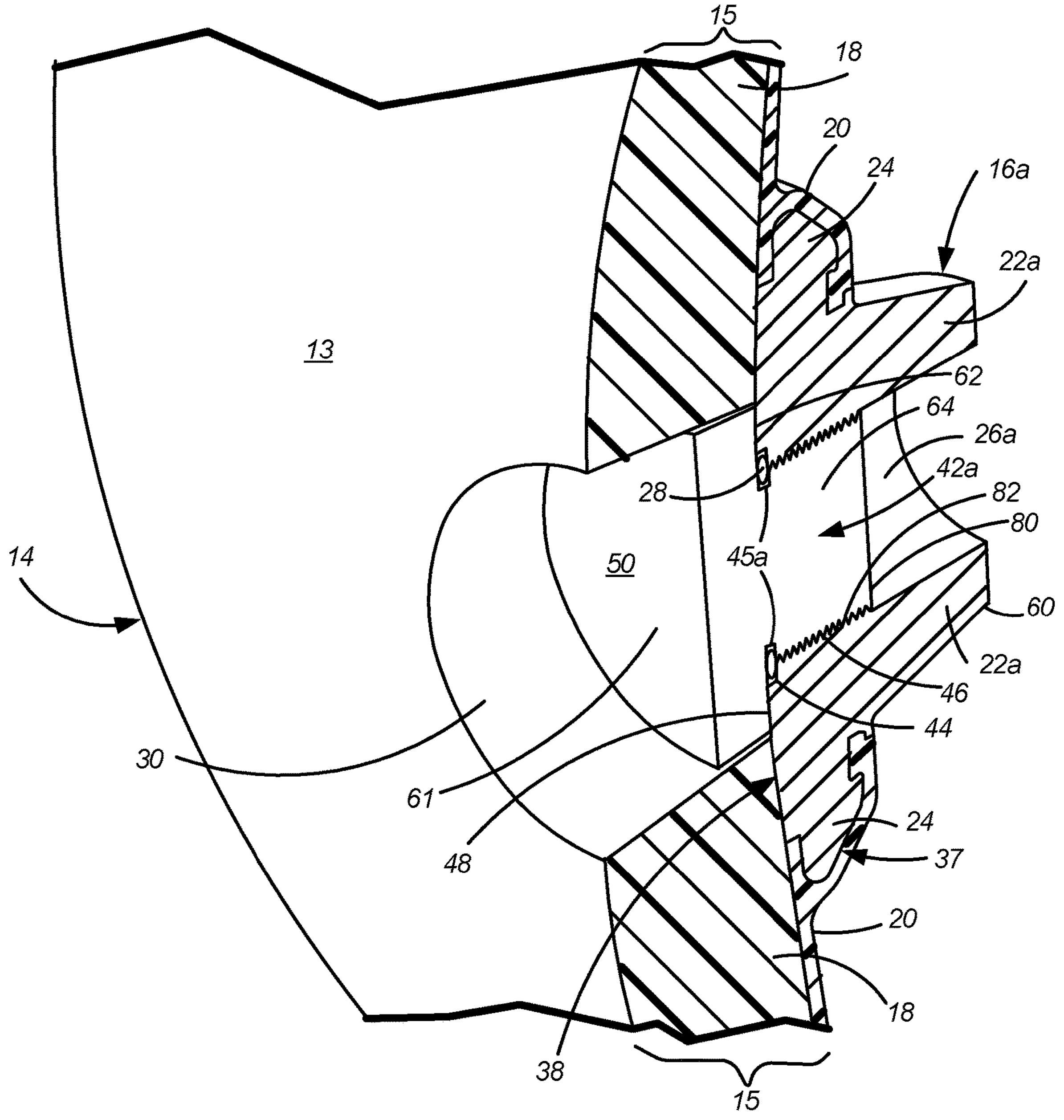
FIG. 5 is similar to FIG. 4 but shows a plug inserted into a port of the pressure vessel and boss.

In an embodiment shown in FIGS. 3-5, the present disclosure describes a boss 16*a* for a pressure vessel 10*a*. Boss 16*a* includes in interiorly projecting neck 22*a* having a port or bore 26*a* therethrough. Pressure vessel 10*a* and bore 26*a* have a common longitudinal axis 40. Boss 16*a* has a flange 24 that extends radially outward from neck 22*a*. Flange 24 includes an exterior side 38 facing toward exterior environment 19 and an interior side 37 facing interior environment 17. Liner 20 extends around flange 24 but does not contact at least an interiorly extending portion of neck 22*a*. Thus, this structure results in a secure mechanical interlock between boss 16*a* and liner 20 without additional interface surfaces that may suffer delamination.

As shown in FIGS. 4 and 5, boss 16*a* has port 26*a* for the insertion of plug 42*a*, which may include valve structures (not shown) to control gas egress and ingress from and to pressure vessel 10*a*. Such valve structures may close to seal pressure vessel 10*a* and prevent gas exchange between interior environment 17 and exterior environment 19. And such valve structures may open to allow gas exchange between interior environment 17 and exterior environment 19. In an exemplary embodiment, as shown in FIG. 4, the exterior face 48 of boss 16*a* includes an annular groove 44 to accommodate a seal 28 such as a gasket or o-ring (labeled in FIG. 5). A complementary groove 45*a* in plug 42*a* cooperates with the annular groove 44 to form a channel in which seal 28 is disposed between plug 42*a* and boss 16*a*.

In an exemplary embodiment, plug 42*a* includes head 61 and stem 64, wherein shoulder 62 is defined on an interior surface of head 61. In an exemplary embodiment, a portion of port 26*a* includes a threaded section 46 to couple with complementary exterior threaded section 82 on stem 64 of plug 42*a*. In an exemplary embodiment, threaded section 82 of plug 42*a* extends along an entirety of stem 64, but the lengths of threaded section 82 and of stem 64 need not be the same.

As shown in FIG. 5, when plug 42*a* is attached to pressure vessel 10*a*, its shoulder 62 is seated against exterior face 48 of boss 16*a*. Accordingly, the boss 16*a* of FIGS. 3-5 is referred to as a face seal embodiment. As shown in FIG. 5, in the illustrated embodiment, an exterior surface 50 of plug 42*a* is recessed inward from an outer surface 13 of shell 18. The configuration of boss 16*a* with an inwardly projecting neck 22*a*, which extends toward an interior 17 of the pressure vessel from the flange 24, allows for efficient use of the length of the pressure vessel 10*a*.

Figure 6:
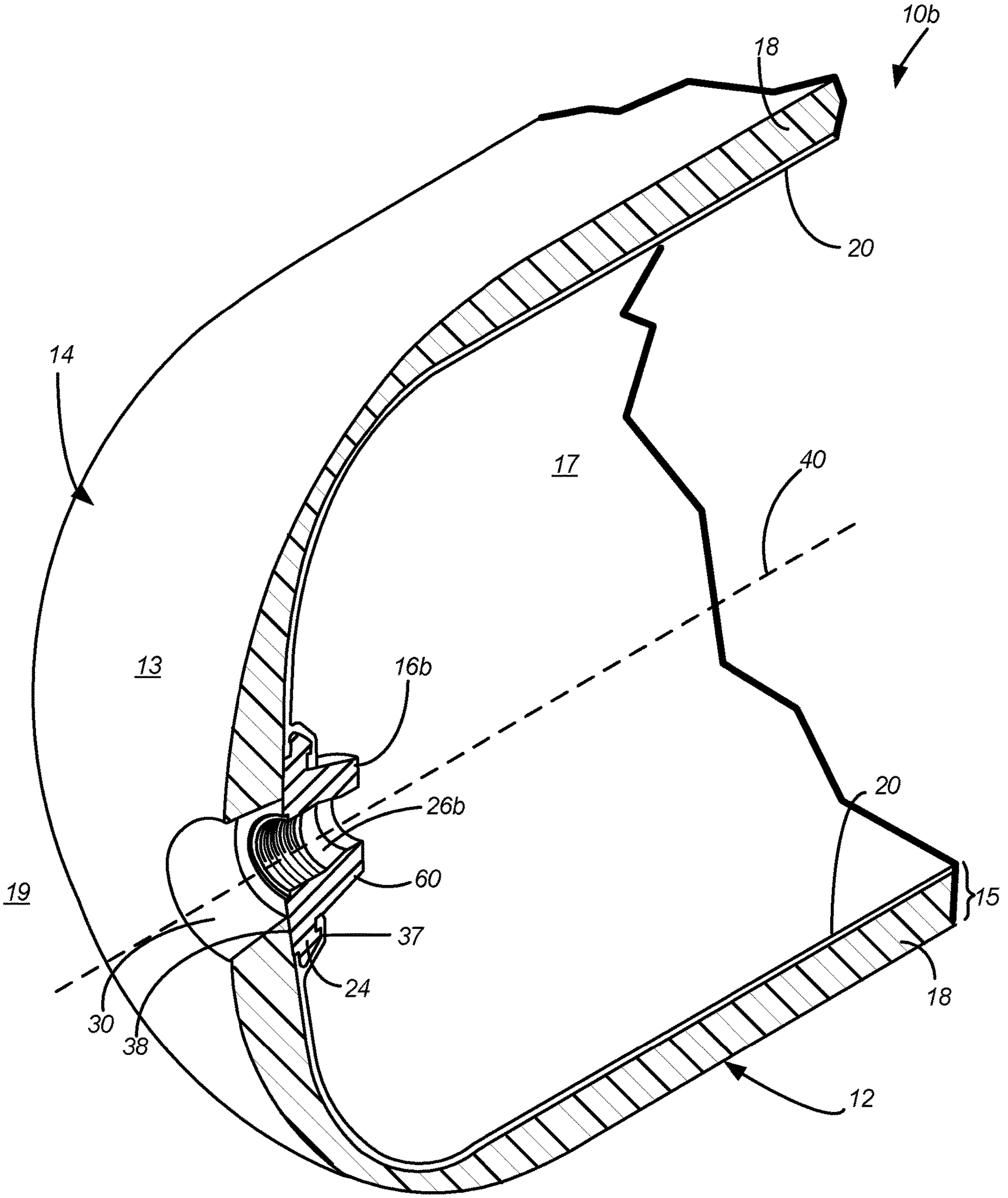
FIG. 6 is a cross-sectional partial perspective view of a pressure vessel with a second exemplary embodiment of a boss with an inverted neck, configured for a bore sealing assembly with the pressure vessel plug shown in FIG. 8.
Figure 7:
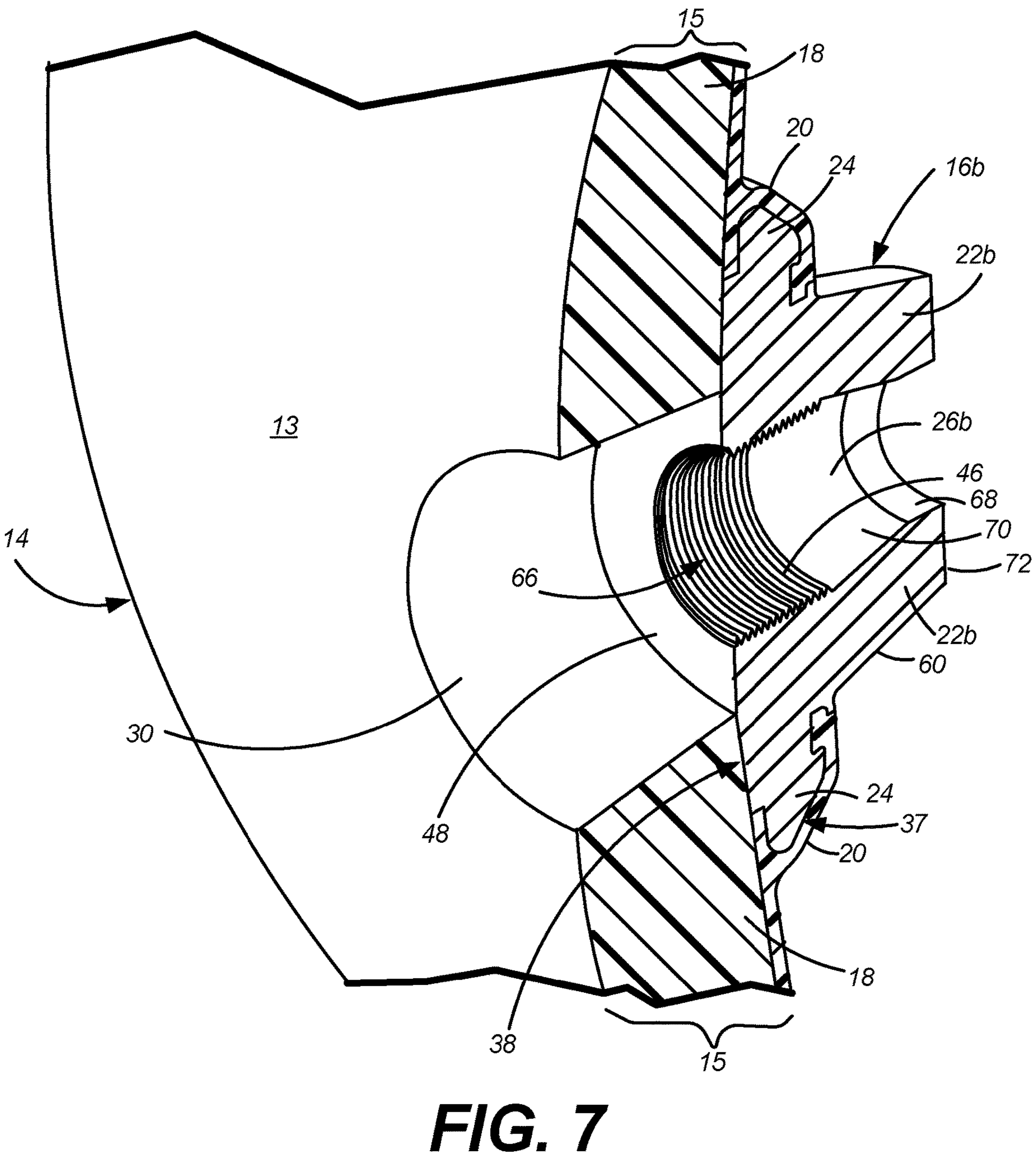
FIG. 7 is an enlarged view of a portion of FIG. 6.
Figure 8:
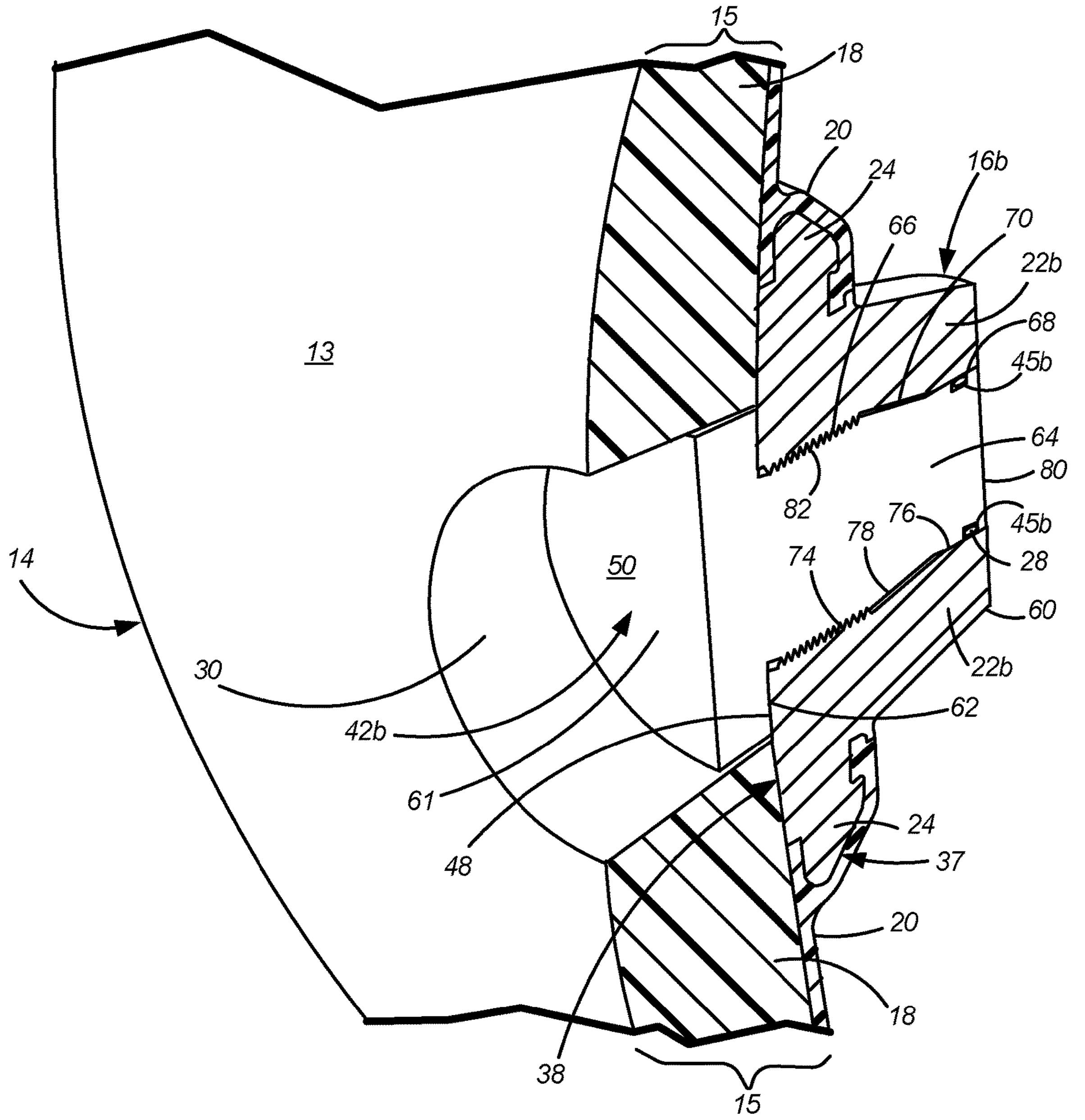
FIG. 8 is similar to FIG. 7 but shows a plug inserted into a port of the pressure vessel and boss.

In an embodiment shown in FIGS. 6-8, the present disclosure describes a boss 16*b* for a pressure vessel 10*b*. Boss 16*b* includes in interiorly projecting neck 22*b* having a port or bore 26*b* therethrough. Pressure vessel 10*b* and bore 26*b* have a common longitudinal axis 40. Boss 16*b* has a flange 24 that extends radially outward from neck 22*b*. Flange 24 includes an exterior side 38 facing toward exterior environment 19 and an interior side 37 facing interior environment 17. Liner 20 extends around flange 24 but does not contact at least an interiorly extending portion of neck 22*b*. Thus, this structure results in a secure mechanical interlock between boss 16*b* and liner 20 without additional interface surfaces that may suffer delamination.

As shown in FIGS. 7 and 8, boss 16*b* has port 26*b* for the insertion of plug 42*b*, which may include valve structures (not shown) to control gas egress and ingress from and to pressure vessel 10*b*. Such valve structures may close to seal pressure vessel 10*b* and prevent gas exchange between interior environment 17 and exterior environment 19. And such valve structures may open to allow gas exchange between interior environment 17 and exterior environment 19.

In an exemplary embodiment, bore 26*b* has an exterior portion 66 with a larger inner diameter proximate exterior face 48 of boss 16*b*. Bore 26*b* has an interior portion 68 having a relatively smaller inner diameter proximate interior end 72. In an exemplary embodiment, an inclined intermediate portion 70 connects exterior portion 66 and interior portion 68. The intermediate portion 70 is inclined at an acute angle (less than 90 degrees) relative to longitudinal axis 40. The tapering of bore 26*b* reflects a tapering of the outer surface of neck 22*b*, so that a thickness and strength of neck 22*b* is maintained, even as its outer surface is tapered, allowing for greater volume in the interior environment 17 of pressure vessel 10*a*, 10*b*. In an exemplary embodiment, threaded section 46 of port 26*b* extends along an entirety of exterior portion 66, but the lengths of threaded section 46 and of exterior portion 66 need not be the same.

As shown in FIG. 8, in an exemplary embodiment, stem 64 of plug 42*b* has an exterior portion 74 with a larger outer diameter proximate head 61. Stem 64 has an interior portion 76 with a relatively smaller outer diameter proximate interior end 80. In an exemplary embodiment, an inclined intermediate portion 78 connects exterior portion 74 and interior portion 76. The intermediate portion 78 is inclined at an acute angle (less than 90 degrees) relative to longitudinal axis 40. In an exemplary embodiment, threaded section 82 of plug 42*b* extends along an entirety of exterior portion 74, but the lengths of threaded section 82 and of exterior portion 74 need not be the same.

In an exemplary embodiment, as shown in FIG. 8, an annular groove 45*b* in stem 64 of plug 42*b* cooperates with the bore 26*b* to form a channel in which an annular seal 28 such as a gasket or o-ring (labeled in FIG. 8) is disposed between plug 42*b* and boss 16*b*. In an exemplary embodiment, groove 45*b* is disposed on interior portion 76 of stem 64. Alternatively, or in addition, a seal groove can be provided on an interior surface of neck 22*b*. In an exemplary embodiment, plug 42*b* includes head 61 and stem 64, wherein shoulder 62 is defined on an interior surface of head 61. In an exemplary embodiment, a portion of port 26*b* includes a threaded section 46 to couple with complementary exterior threaded section 82 on plug 42*b*. As shown in FIG. 8, when plug 42*b* is attached to pressure vessel 10*b*, its shoulder 62 is seated against exterior face 48 of boss 16*b*. The annular seal 28 (such as a gasket or o-ring) is provided at groove 45*b* of the stem 64 of plug 42*b* and seals against a surface of bore 26*b*. Accordingly, the boss 16*b* of FIGS. 6-8 is referred to as a bore seal embodiment. As shown in FIG. 8, in an illustrated embodiment, an exterior surface 50 of plug 42*b* is recessed inward from an outer surface 13 of shell 18. The configuration of boss 16*b* with an inwardly projecting neck 22*b*, which extends toward an interior 17 of the pressure vessel from the flange 24, allows for efficient use of the length of the pressure vessel 10*b*.

Figure 9A:
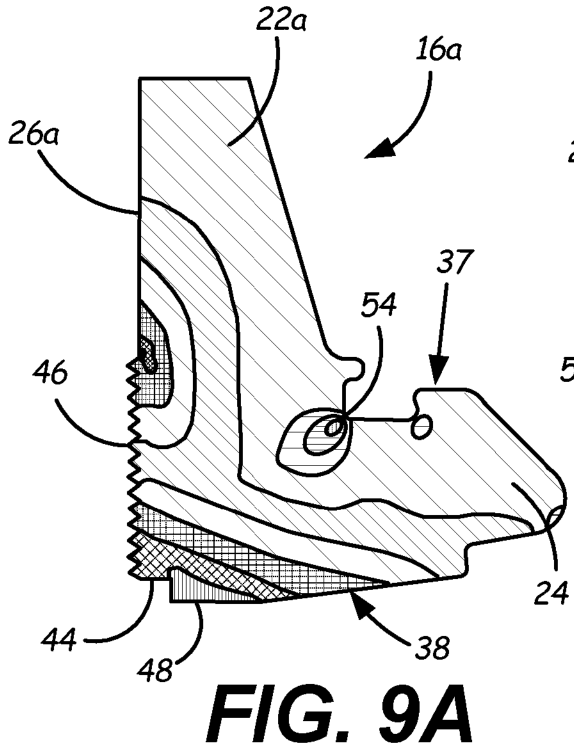
FIG. 9A is a partial section view of the boss of FIGS. 3-5, showing principal stresses experienced by the boss.
Figure 9B:
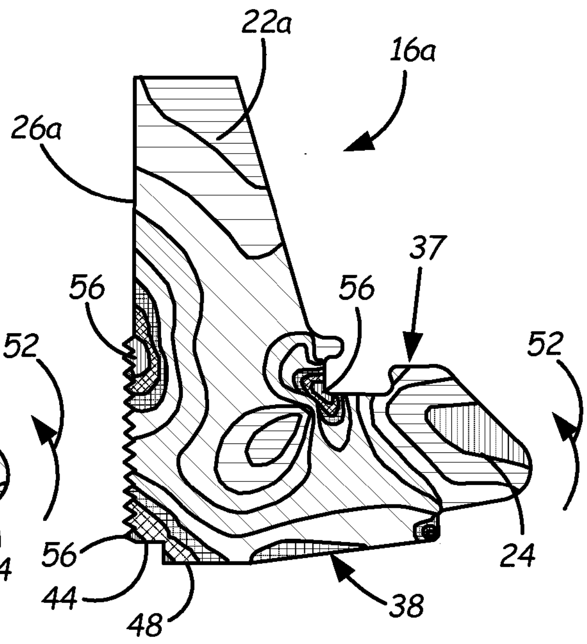
FIG. 9B is a partial section view of the boss of FIGS. 3-5, showing equivalent stresses of the boss.

FIGS. 9A-9B are quarter-sectional views of boss 16*a* being deformed under a test at a pressure much higher than an expected exposure pressure level for the boss 16*a* during use. For example, in a boss 16*a* designed for use at 700 bar, a test run at 1,050 bar to deform flange 24 in the direction of arrow 52 toward neck 22*a* results in the principal stresses shown in FIG. 9A. illustrated as tension primarily at exterior face 48 near channel 44 and compression at zone 54. FIG. 9B shows equivalent stresses, including yielding at proof at zones labeled 56. Equivalent stress is also known as von Mise's stress. the combined stress state used to predict the onset of material yielding. Yielding is defined as the stress level in the material in which a non-linear stress-strain response is predicted to start.

Figure 10A:
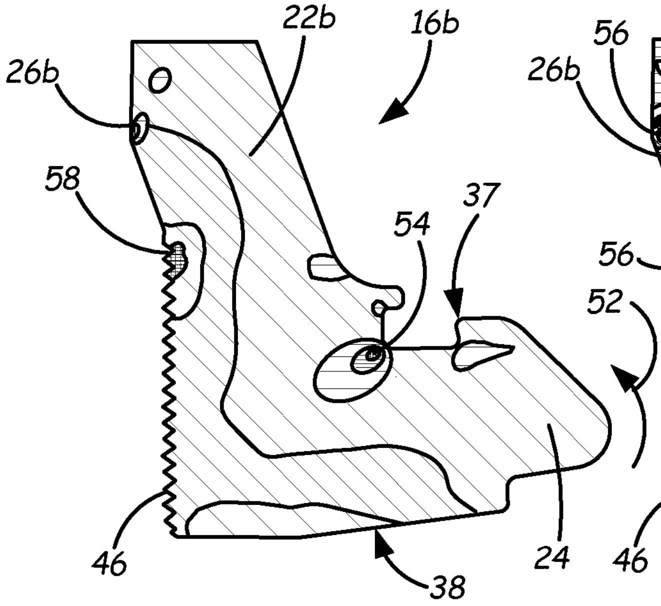
FIG. 10A is a partial section view of the boss of FIGS. 6-8, showing principal stresses experienced by the boss.
Figure 10B:
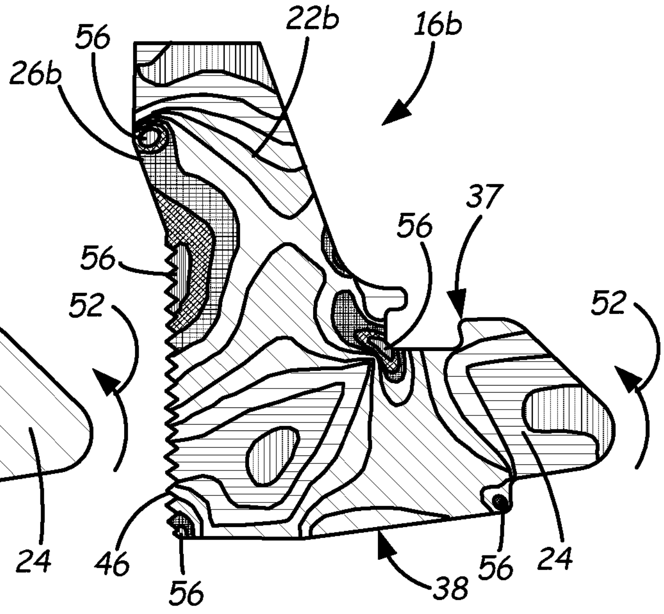
FIG. 10B is a partial section view of the boss of FIGS. 6-8, showing equivalent stresses experienced by the boss.

FIGS. 10A-10B are quarter sectional views of boss 16*b* being deformed under a test at a pressure much higher than an expected exposure pressure level for the boss 16*b* during use. For example, in a boss 16*b* designed for use at 700 bar, a test run at 1,050 bar to deform flange 24 in the direction of arrow 52 toward neck 22*b* results in the principal stresses shown in FIG. 10A, illustrated as tension at zone 58 and compression at zone 54. FIG. 10B shows equivalent stresses, including yielding at proof at zones labeled 56.

The provision of an internally projecting neck 22*a*, 22*b* increases the plate bending stiffness of flange 24 without any portion of the boss 16*a*, 16*b* extending along the shell 18 (or extending exteriorly of the outer surface 13 of the shell 18). Thus, the use of boss 16*a*, 16*b* in pressure vessels 10*a*, 10*b* is suitable for very high-pressure applications and maximizes the volumetric capacity of the pressure vessel 10*a*, 10*b* for a given length of available space.

Non-limiting, exemplary embodiments of pressure vessels 10*a*, 10*b* are described. For example, pressure vessel 10*a*, 10*b* comprises a composite wall 15 and a boss 16*a*, 16*b*. The composite wall 15 comprises an outer shell 18 and an inner liner 20 disposed within the outer shell 18. The composite wall 15 comprises a port 30 through which fluid may be communicated between an exterior 19 of the pressure vessel 10*a*, 10*b* and an interior 17 of the pressure vessel 10*a*, 10*b*. A boss 16*a*, 16*b* is disposed at the port 30, the boss 16*a*, 16*b* comprising a neck 22*a*, 22*b* projecting interiorly into the pressure vessel 10*a*, 10*b* and a flange 24 extending radially outward from the neck 22*a*, 22*b*. The liner 20 contacts the flange 24 and does not contact at least an interiorly extending portion 60 of the neck 22*a*, 22*b*.

In an exemplary embodiment, an exterior face 48 of the boss 16*a*, 16*b* does not extend exteriorly past an innermost surface of the shell 18. In an exemplary embodiment, the boss 16*a*, 16*b* comprises a bore 26*a*, 26*b* extending through the neck 22*a*, 22*b* and flange 24. In an exemplary embodiment, the bore 26*a*, 26*b* comprises a threaded section 46. In an exemplary embodiment, the flange 24 comprises an interior side 37 and an exterior side 38. An exterior face 48 of the boss 16*a* comprises an annular groove 44 proximate the bore 26*a*.

In an exemplary embodiment, a plug 42*a*, 42*b* is disposed in the bore 26*a*, 26*b*. In an exemplary embodiment, a shoulder 62 of the plug 42*a*, 42*b* contacts an exterior face 48 of the boss 16*a*, 16*b*. In an exemplary embodiment, the plug 42*a*, 42*b* comprises an annular groove 45*a*, 45*b* on a stem 64 of the plug 42*a*, 42*b*.

Although the subject of this disclosure has been described with reference to several embodiments, workers skilled in the art will recognize that changes may be made in form and detail without departing from the scope of the disclosure. In addition, any feature or description disclosed with respect to one embodiment is applicable to and may be incorporated in another embodiment, and vice-versa.

The invention claimed is:

1. A pressure vessel comprising:
- a composite wall having a dome end and comprising:
  - an outer shell;
  - an inner liner disposed within the outer shell; and
  - a port in the wall at the dome end through which fluid may be communicated between an exterior of the pressure vessel and an interior of the pressure vessel; and
- a boss disposed at the port, wherein the boss does not extend exteriorly past an innermost surface of the shell at the port, the boss comprising:
  - a neck projecting interiorly into the pressure vessel;
  - a flange extending radially outward from the neck, wherein an exterior face of the flange contacts the outer shell; and
  - a bore extending through the neck and flange;
  - wherein the neck comprises an end surface and an interiorly extending surface disposed between the flange and the end surface, wherein the end surface comprises an inner radial boundary at the bore and an outer radial periphery at the interiorly extending surface;
- wherein the liner contacts the flange and does not contact the interiorly extending surface of the neck.

2. The pressure vessel of claim 1 wherein the exterior face comprises an annular groove proximate the bore.

3. The pressure vessel of claim 2 comprising a seal disposed in the annular groove.

4. The pressure vessel of claim 1 comprising a plug disposed in the bore.

5. The pressure vessel of claim 4 wherein the plug comprises:
- a head with a shoulder; and
- a stem.

6. The pressure vessel of claim 5 wherein the shoulder of the plug contacts an exterior face of the boss.

7. The pressure vessel of claim 5 wherein the stem comprises an exterior stem portion and an interior stem portion, wherein the exterior stem portion and interior stem portion have different outer diameters.

8. The pressure vessel of claim 7 comprising an intermediate stem portion connecting the exterior stem portion and the interior stem portion.

9. The pressure vessel of claim 5 wherein the stem comprises an annular groove.

10. The pressure vessel of claim 9 comprising a seal disposed in the annular groove.

11. The pressure vessel of claim 8 wherein an annular groove is disposed on the interior stem portion.

12. The pressure vessel of claim 1 wherein the bore comprises a first threaded section.

13. The pressure vessel of claim 12 comprising a plug disposed in the bore and having a second threaded section configured to cooperate with the first threaded section.

14. The pressure vessel of claim 13 wherein the first threaded section and the second threaded section have a common length.

15. The pressure vessel of claim 1 wherein the bore comprises an exterior bore portion and an interior bore portion, wherein the exterior bore portion and interior bore portion have different inner diameters.

16. The pressure vessel of claim 15 comprising an intermediate bore portion connecting the exterior bore portion and the interior bore portion.

17. The pressure vessel of claim 16 wherein the intermediate bore portion is inclined at an acute angle relative to a longitudinal axis of the pressure vessel.

* * * * *